(12) United States Patent
Zhu

(10) Patent No.: US 12,386,879 B2
(45) Date of Patent: Aug. 12, 2025

(54) SEARCH RESULT DISPLAY METHOD, APPARATUS AND DEVICE, AND MEDIUM

(71) Applicant: Beijing Bytedance Network Technology Co., Ltd., Beijing (CN)

(72) Inventor: Liping Zhu, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 18/492,326

(22) Filed: Oct. 23, 2023

(65) Prior Publication Data

US 2024/0045898 A1    Feb. 8, 2024

Related U.S. Application Data

(63) Continuation of application No. PCT/CN2022/092157, filed on May 11, 2022.

(30) Foreign Application Priority Data

Jul. 30, 2021    (CN) .......................... 202110875304.2

(51) Int. Cl.
  *G06F 16/438*    (2019.01)
  *G06F 16/435*    (2019.01)

(52) U.S. Cl.
  CPC .......... *G06F 16/438* (2019.01); *G06F 16/435* (2019.01)

(58) Field of Classification Search
  CPC .. G06F 16/24578; G06F 16/248; G06F 16/40; G06F 16/43; G06F 16/432;
  (Continued)

(56) References Cited

U.S. PATENT DOCUMENTS 7,664,739 B2 *  2/2010  Farago ................. G06F 3/0485
                                                                 707/610
2007/0203903 A1 *  8/2007  Attaran Rezaei ..... G06F 16/954
                                                                 707/999.005
(Continued)

FOREIGN PATENT DOCUMENTS

CN    103235812 A    8/2013
CN    103279504 A    9/2013
(Continued)

OTHER PUBLICATIONS

International Search Report dated Jul. 27, 2022 in PCT Appl. No. PCT/CN2022/092157, English translation (5 pages).
(Continued)

*Primary Examiner* — Robert W Beausoliel, Jr.
*Assistant Examiner* — Cheryl M Shechtman

(57) ABSTRACT

A search result display method, apparatus and device, and a medium, which relate to the technical field of computers, the method including: receiving a search term, the search term corresponding to search intentions; and displaying target search results related to each search intention in regions in a search result page, the target search result including key information representing the search intentions and target multimedia content corresponding to the key information. According to the method, a user may simultaneously see target search results of search intentions in a search result page, improving the information content of the search result page; moreover, target multimedia content of the same search intentions are displayed in the same region in the search result page, so that the user may continuously consume search results corresponding to a certain search intention, improving the search result screening efficiency and the consumption efficiency.

16 Claims, 10 Drawing Sheets

(58) Field of Classification Search
CPC ...... G06F 16/435; G06F 16/438; G06F 16/48;
G06F 16/483; G06F 16/951; G06F
16/9532; G06F 16/9535; G06F 16/9536;
G06F 16/9538; G06F 16/954; G06F
16/9577; G06F 3/048; G06F 3/0482;
G06F 3/04842
See application file for complete search history.

(56) References Cited

U.S. PATENT DOCUMENTS

| | | | | |
|---|---|---|---|---|
| 2011/0270672 | A1* | 11/2011 | Hillard | G06Q 30/0246 |
| | | | | 705/14.42 |
| 2014/0136536 | A1 | 5/2014 | Ramsey et al. | |
| 2015/0310116 | A1* | 10/2015 | Fan | G06F 16/951 |
| | | | | 707/731 |
| 2016/0055252 | A1 | 2/2016 | Makeev et al. | |
| 2018/0052913 | A1 | 2/2018 | Gaskill et al. | |
| 2018/0089197 | A1 | 3/2018 | Barron et al. | |
| 2019/0005089 | A1* | 1/2019 | Kempf | G06F 16/2425 |
| 2021/0141839 | A1 | 5/2021 | Tang et al. | |
| 2024/0338862 | A1* | 10/2024 | Liu | G06T 11/00 |

FOREIGN PATENT DOCUMENTS

| | | | |
|---|---|---|---|
| CN | 104838375 | A | 8/2015 |
| CN | 108197284 | A | 6/2018 |
| CN | 108614830 | A | 10/2018 |
| CN | 109543016 | A | 3/2019 |
| CN | 110334271 | A | 10/2019 |
| CN | 111444405 | A | 7/2020 |
| CN | 111597433 | A | 8/2020 |
| CN | 111859195 | A | 10/2020 |
| CN | 112148977 | A | 12/2020 |
| CN | 112749328 | A | 5/2021 |
| CN | 113158004 | A | 7/2021 |
| CN | 113486252 | A | 10/2021 |
| CN | 113486252 | B | 8/2024 |
| JP | 2002-278980 | A | 9/2002 |
| JP | 2009-093648 | A | 4/2009 |
| JP | 2010-515125 | A | 5/2010 |
| WO | 2017/076038 | A1 | 5/2017 |
| WO | 2019/085236 | A1 | 5/2019 |
| WO | 2021/185326 | A1 | 9/2021 |

OTHER PUBLICATIONS

Office action received from Chinese patent application No. 202110875304.2 mailed on Mar. 22, 2024, 13 pages (6 pages English Translation and 7 pages Original Copy).
Communication Pursuant to Rules 70(2) and 70a(2) EPC for European Application No. 22847953.1, mailed Oct. 9, 2024, 1 Page.
Office action received from Japanese patent application No. 2023-566605 mailed on Nov. 19, 2024, 9 pages (4 pages English Translation and 5 pages Original Copy).
European Search Report for EP Patent Application No. 22847953.1, Issued on Sep. 18, 2024, 7 pages.
Notification of registration procedures received from Chinese patent application No. 202110875304.2 mailed on Jul. 25, 2024, 5 pages (1 pages English Translation and 4 pages Original Copy).

* cited by examiner

SEARCH RESULT DISPLAY METHOD, APPARATUS AND DEVICE, AND MEDIUM

This application is a continuation of International Patent Application No. PCT/CN2022/092157, filed on May 11, 2022, which claims priority of the Chinese patent application entitled "SEARCH RESULT DISPLAY METHOD, APPARATUS AND DEVICE, AND MEDIUM" filed to the Patent Office of China on Jul. 30, 2021, with the Application No. 202110875304.2, the disclosure of which is incorporated herein by reference in its entirety.

TECHNICAL FIELD

The present disclosure relates to a field of computer technology, and more particularly, to a search result display method, apparatus and device, and a medium.

BACKGROUND

At present, a comprehensive search engine usually comprehensively sorts each single search result that meets search conditions across the entire network according to factors such as correlation between the search result and a search term, and content quality of the search result, etc., and then presents the sorted respective search results to a user.

In a first aspect, the present disclosure provides a search result display method, comprising: receiving a search term, the search term corresponding to a plurality of search intentions; and displaying target search results related to respective search intentions in regions on a search result page, wherein the target search results comprise key information representing the search intentions and target multimedia contents corresponding to the key information.

In a second aspect, the present disclosure provides a search result display apparatus, the search result display apparatus comprises a search term receiving module and a search result displaying module, the search term receiving module is configured to receive a search term, the search term corresponding to a plurality of search intentions, the search result displaying module is configured to display target search results related to respective search intentions in regions on a search result page, wherein the target search results comprise key information representing the search intentions and target multimedia contents corresponding to the key information.

In a third aspect, the present disclosure provides a search result display device, the search result display device comprises a processor and a memory, the memory is configured to store executable instructions, wherein the processor is configured to read the executable instructions from the memory and execute the executable instructions to implement the search result display method described in the first aspect above.

In a fourth aspect, the present disclosure provides a computer readable storage medium, on which a computer program is stored, wherein the computer program, when executed by a processor, causes the processer to implement the search result display method described in the first aspect above.

With respect to a pan search term with a general search intention, respective search results corresponding thereto usually covers a plurality of categories, and the search intention of the user is usually one or several categories among the plurality of categories. This requires the user to select and consume from the respective search results presented by the comprehensive search engine, which undoubtedly increases a difficulty for the user to acquire search results desired thereby and reduces efficiency of the user in consuming the search results.

SUMMARY

In order to solve the above-described technical problems or at least partially solve the above-described technical problems, the present disclosure provides a search result display method, apparatus and device, and a medium, which may reduce a difficulty for a user to acquire search results desired thereby and improve efficiency of the user in consuming the search results.

The embodiments of the present disclosure provide the search result display method, apparatus and device and the medium, wherein in the method, search results related to respective search intentions corresponding to the search term are displayed in regions on the search result page, and the search results related to the search intentions include key information representing the search intentions and target multimedia contents corresponding to the key information. In this way, a user may view search results of a plurality of search intentions simultaneously on the search result page, which improves efficiency of the user in filtering search results and enhances information content of the search result page. Moreover, respective search results of a same search intention are displayed in a same region on the search result page, so that the user may continuously consume search results corresponding to a certain search intention, which improves efficiency of the user in consuming the search results.

BRIEF DESCRIPTION OF THE DRAWINGS

The above-described and other features, advantages and aspects of the respective embodiments of the present disclosure will become more apparent when taken in conjunction with the accompanying drawings and with reference to the detailed description below. Throughout the drawings, same or similar reference signs refer to same or similar elements. It should be understood that, the drawings are schematic and that originals and elements are not necessarily drawn to scale.

DETAILED DESCRIPTION

Figure 1:
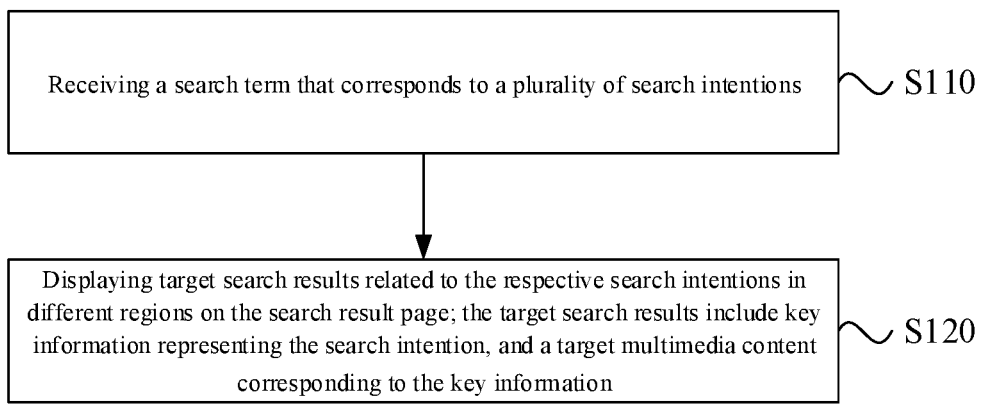
FIG. 1 is a schematic flow chart of a search result display method provided by an embodiment of the present disclosure.

Embodiments of the present disclosure will be described in more detail below with reference to the accompanying drawings. While certain embodiments of the present disclosure are shown in the drawings, it should be understood that, the present disclosure may be embodied in various forms and should not be construed as limited to the embodiments set forth herein. Rather, these embodiments are provided for thorough and complete understanding of the present disclosure. It should be understood that, the drawings and the embodiments of the present disclosure are only for exemplary purposes, and are not intended to limit the protection scope of the present disclosure.

It should be understood that various steps described in the method implementations of the present disclosure may be executed in different orders and/or in parallel. Further, the method implementations may include additional steps and/or omit execution of the steps shown. The scope of the present disclosure will not be limited in this regard.

The term "including" and variants thereof used herein are open including, that is, "including but not limited to". The term "based on" is "at least partially based on". The term "one embodiment" represents "at least one embodiment"; the term "another embodiment" represents "at least one other embodiment"; and the term "some embodiments" represents "at least some embodiments". Relevant definitions of other terms will be given in description below.

It should be noted that concepts such as "first", "second", etc. as mentioned in the present disclosure are only used to distinguish apparatuses, modules or units, but not to define orders or interdependence of functions executed by these apparatuses, modules or units.

It should be noted that modification of "one" and "a plurality of" as mentioned in the present disclosure is exemplary rather than restrictive, and those skilled in the art should understand that unless otherwise explicitly specified in the context, it should be understood as "one or more".

Names of messages or information interacted between a plurality of apparatuses according to the implementations of the present disclosure are only used for illustrative purposes, and are not used to limit the scope of these messages or information.

An existing search engine usually searches to obtain all search results according to a search term, then comprehensively evaluates and sorts the respective search results based on various factors, and further presents the sorted search results to a user. When the search term input by the user is a pan search term, the respective search results fed back by the search engine are search results of a plurality of search intentions (or categories) corresponding to the search term that are arranged in a mixed manner. If the user wants to consume search results of a search intention he/she is interested in, he/she needs to select and consume from all search results, so that efficiency of both filtering search results and consuming search results is very low.

In order to solve the above-described problems, the embodiments of the present disclosure provide a search result display method, apparatus and device, and a medium, to display search results of different search intentions (or categories) in regions on a search result page for a pan search scenario, which, thus, may improve information display density (i.e. information content) on the search result page, and improve efficiency in filtering and consuming search results.

Hereinafter, firstly, the search result display method provided by the embodiment of the present disclosure will be illustrated in conjunction with FIG. 1 to FIG. 9.

In the embodiment of the present disclosure, the search result display method may be executed by an electronic device. For example, the electronic device may include but not limited to a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), a wearable device, etc., and a stationary terminal such as a digital TV, a desktop computer, a smart home appliance, etc.

FIG. 1 shows a schematic flow chart of a search result display method provided by an embodiment of the present disclosure. As shown in FIG. 1, the search result display method may include steps of:

S110: receiving a search term that corresponds to a plurality of search intentions.

For example, the search term is a content input by a user, based on which a search engine is required to perform a search operation and feed search results back. Given that the embodiment of the present disclosure is applicable to a pan search scenario, the search term may be an keyword or a short sentence. A search intention (also referred to as a "user intention") refers to a main target that the user wants to achieve when searching on a search engine. In the embodiment of the present disclosure, the search intention is a search target that may be covered by the search term.

Optionally, the search intention is either a polysemy search intention or a multi-topic search intention. The polysemy search intention refers to a search intention corresponding to each semantic term when the search term includes a plurality of semantic terms. The multi-topic search intention refers to a scope that may be covered or a search intention corresponding to the topic when the search term is a pan search term. A specific type of a search intention is determined according to a type of the search term. For example, if the search term is a polysemy term, then the search intention is a polysemy search intention; and if the search term is a pan search term, then the search intention is a multi-topic search intention. For a process of determining the type of the search intention based on the search term and determining the respective search intentions, relevant description of a server according to subsequent embodiments may be referred to.

Specifically, the electronic device may receive a search term input by a user on a search page of a specific application or a specific website.

In some embodiments, a user may input any form of information such as text, voice, and image, etc. into the search box within the search page, so that the electronic device takes the text corresponding to the information input by the user as the search term input by the user.

For example, the user may input text information "Li XX" into the search box within the search page, and the electronic device may take "Li XX" as the search term, and further search for a content related to "Li XX" for the user.

For example, the user may input voice information "Li XX" into the search box within the search page, and the electronic device may perform voice recognition processing on the voice information to obtain the search term "Li XX", and further search for a content related to "Li XX" for the user.

For example, the user may input an image with the text "Li XX" or an image with a picture content "Li XX" into the search box within the search page; the electronic device may perform image text recognition processing or image content recognition processing on the image, to obtain the search term "Li XX", and further search for a content associated with "Li XX" for the user.

In some other embodiments, a plurality of candidate search terms may also be displayed within the search page, and the user may select from the candidate search terms displayed, so that the electronic device takes a candidate search term selected by the user as the search term.

For example, there may be candidate search terms such as "dress", "spring/summer clothing", "outfit", etc. displayed within the search page; the user may select "dress", so that the electronic device may take "dress" selected by the user as the search term, and further search for a content related to "dress" for the user.

In the embodiment of the present disclosure, after receiving the search term input by the user, the electronic device may send the search term to a server.

The server may search based on the search term, to obtain respective search results corresponding to the search term. The server may also analyze the search term and/or the respective search results corresponding to the search term, to determine a type of the search intention corresponding to the search term, the respective search intentions, key information corresponding to each search intention, and a category of search results corresponding to the corresponding key information. The key information here refers to information that may describe the corresponding search intention.

In some embodiments, a term library is preset in the server; the term library has a plurality of terms, a type of search intention corresponding to each term, and a specific search intention stored therein. The server matches the search term with the term in the term library, determines the type of search intention corresponding to the term with the highest degree of matching as the type of search intention corresponding to the search term, and determines the specific search intention corresponding to the term as respective search intentions corresponding to the search term. Then, the server categorizes or aggregates the respective search results of the search term according to the respective search intentions determined, so as to obtain a category of search results corresponding to each search intention of the search term. Setting of the above-described term library may improve search efficiency of the server.

In some other embodiments, the server firstly queries whether the search term is a polysemy term based on professional term interpretation tools such as encyclopedia. If YES, the server determines the type of search intention of the search term as polysemy search intention, and determines each semantic term of the search term as the search intention of the search term. Then, the respective search results corresponding to the search term are categorized according to the respective search intentions determined, to obtain a category of search results corresponding to each search intention of the search term. For example, if the search term is "Li XX", which has a plurality of polysemy terms in the encyclopedia, i.e., "poet Li XX", "game character Li XX", and "song Li XX", then "poet Li XX", "game character Li XX", and "song Li XX" are determined as three search intentions of the search term "Li XX".

If it is determined that the search term is not a polysemy term through the above-described query, the type of search intention of the search term is determined as a multi-topic search intention. Then, the server performs term matching on the search term from the preset term library. Next, the server determines the type of search intention corresponding to the term with the highest degree of matching as the type of search intention corresponding to the search term, and determines the specific search intention corresponding to the term as respective search intentions corresponding to the search term. Thereafter, the server categorizes and aggregates the respective search results of the search term according to the respective search intentions determined, so as to obtain a category of search results corresponding to each search intention of the search term. The above-described combination of professional term interpretation tools such as encyclopedia and the term library may improve search efficiency of the server while reducing workload of building the term library.

In still some other embodiments, the server does not have a term library preset, but instead parses the search term and the search results thereof in real time to determine search intention related information of the search term.

Similar to the previous embodiment, the server firstly queries the search term according to professional term interpretation tools such as encyclopedia. If found, the server determines the type of search intention of the search term, respective search intentions, and a category of search results corresponding to each search intention in the same way.

If it is determined that the search term is not a polysemy term through the above-described query, the type of the search intention of the search term is determined as a multi-topic search intention. Then, the server performs keyword extraction on all search results corresponding to the search term, to obtain respective keywords. Moreover, the server selects an keyword that is representative (e.g., the keyword corresponds to a greater number of search results) and has a certain degree of difference (e.g., there is low similarity between terms) from the respective keywords, as the respective search intentions corresponding to the search term. Then, the server categorizes and aggregates all search results of the search term according to the respective keywords selected, to obtain a category of search results corresponding to each keyword of the search term.

The above-described mode of extracting the keyword may be directly extracting the keyword from the respective search results; or may also be firstly extracting a core content from the respective search results, and then extracting the keyword from the core content. Regardless of which keyword extraction mode, a specific extraction mode varies for different search results. For example, with respect to search results having a good webpage structure, structured information may be directly extracted from the search results as the keyword. For example, with respect to search results with poor webpage structure, the corresponding search term when the search result is consumed may be determined as the keyword corresponding to the result. For example, with respect to a long-tail content, keyword extraction may be implemented through self-learning of machine learning models.

It should be noted that a building process of the term library according to the above-described respective embodiments may be the same as the above-described process of analyzing the respective search results to determine the search intention related information.

Based on the above-described respective embodiments, the server may determine key information of a corresponding search intention according to a category of search results corresponding to the search intention. For example, if the search intention is "game character Li XX", the server may extract information from a category of search results of the search intention, and determine that key information of the search intention is "hero and assassin of XX game". For example, if a certain search intention of the search term "dress" is "outfit", the server may extract information from a category of search result of the search intention and determine that key information of the search intention is "spring/summer dress outfit".

After the above-described process, the server may feed the determined plurality of search intentions of the search term, as well as key information and search results corresponding to each search intention back to the electronic device.

S120: displaying target search results related to the respective search intentions in regions on the search result page; the target search results including key information representing the search intention, and a target multimedia content corresponding to the key information.

For example, the search result page is a page used to display final search feedback information. The search feedback information may be the respective search results corresponding to the search term, or may also be the target search results obtained after processing the respective search results. The target multimedia content refers to one or more contents obtained based on a category of search results related to the search intentions and displayed on the search result page. The target multimedia content may be at least one from the group consisting of text, image, audio, and video.

Specifically, after obtaining the plurality of search intentions for the search term, and key information and a category of search results corresponding to each search intention fed back by the server, the electronic device firstly generates a target multimedia content corresponding to the corresponding key information according to a category of search results related to each search intention. Then, the electronic device combines key information corresponding to each search intention and a target multimedia content thereof into target search results corresponding to a corresponding search intention. Finally, target search results corresponding to each search intention are displayed in regions on the search result page, that is, a plurality of regions are displayed simultaneously on the search result page, with one region displaying target search results related to one search intention.

Figure 2:
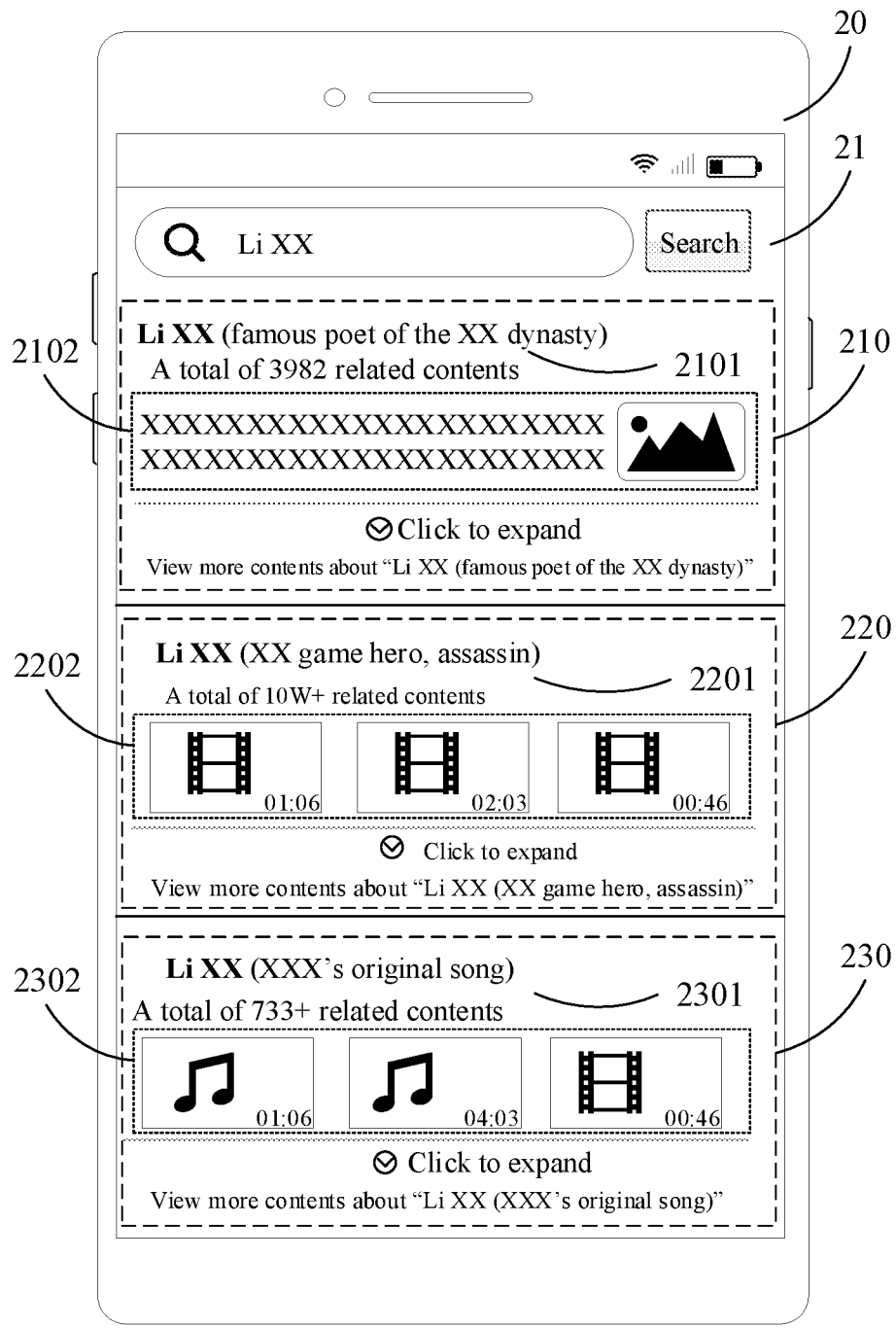
FIG. 2 is a schematic diagram of a search result page provided by an embodiment of the present disclosure.

FIG. 2 shows a schematic diagram of a search result page provided by an embodiment of the present disclosure. As shown in FIG. 2, after the user inputs the search term "Li XX" and triggers search, the server determines the three search intentions of the search term "Li XX", which are respectively "poet Li XX", "game character Li XX", and "song Li XX", and obtains key information and a category of search results corresponding to each search intention. Search result page 21 is displayed in electronic device 20, and upper region 210 of search result page 21 displays target search results corresponding to the search intention "poet Li XX", the target search results display key information "famous poet of the XX dynasty" 2101 and target multimedia content 2102 corresponding thereto of the search intention "poet Li XX". Central region 220 of search result page 21 displays target search results corresponding to the search intention "game character Li XX", the target search results display key information "XX game hero, assassin" 2201 and target multimedia content 2202 corresponding thereto of the search intention "game character Li XX". Lower region 230 of search result page 21 displays target search results corresponding to the search intention "song Li XX", and the target search results display key information "XXX's original song" 2301 and a target multimedia content 2302 corresponding thereto of the search intention "song Li XX".

In some embodiments, the target search results related to the search intentions further include the number of a category of search results related to a corresponding search intention. That is, the target search results further include statistical information about a category of search results related to the search intentions corresponding thereto, for example, the number of search results, the number of users involved when the search results are consumed, and so on. This may to some extent reflect search popularity, consumption popularity, and other information of the relevant search intention.

With further reference to FIG. 2, upper region 210, central region 220, and lower region 230 respectively display the numbers of search results included in the categories of search results corresponding to the search intentions "poet Li XX", "game character Li XX", and "song Li XX", including "a total of 3982 related contents", "a total of 10 W+ related contents", and "a total of 733+ related contents".

In some embodiments, the target multimedia contents include multimedia content preview information.

For example, the multimedia content preview information refers to information of previewing the target multimedia content; and the multimedia content preview information is used for displaying core information of the target multimedia content.

Specifically, the target multimedia content may correspond to one or more search results in a category of search results related to the search intentions; these search results are files containing a lot of information, so it is necessary to extract core information thereof, obtain multimedia content preview information corresponding to each search result, and further combine to obtain the target multimedia content, which is displayed on the search result page.

Attributes of key information for different search intentions vary, and display forms of the multimedia content preview information thereof may also vary. For example, if an attribute of the key information "famous poet of the XX dynasty" of the search intention "poet Li XX" is character, then the multimedia content preview information thereof may be text title and/or image. For another example, if an attribute of the key information "XX game hero, assassin" of the search intention "game character Li XX" is game, then the multimedia content preview information thereof may be video cover of game video. For example, if an attribute of the key information "XXX's original song" of the search intention "song Li XX" is song, then the multimedia content preview information thereof may be audio cover of song audio.

In some embodiments, the target multimedia content is filtered and determined from search results related to the search intention based on a second set indicator value.

For example, the second set indicator value refers to evaluation results of some preset indicators. These second set indicator values include at least one from the group consisting of an attribute of key information, a correlation between the search results and the search term, a content quality of the search results, and a click rate of the search results. The attribute of key information may be a category to which the key information belongs, which may be, for example, character, game, music, flora and fauna, commodity, etc. The click rate of the search result reflects consumption popularity of a search result.

Specifically, the target multimedia contents may include multimedia content preview information of one or more search results in a category of search results related to the search intentions; and the one or more search results are search results filtered out from a category of search results with the highest comprehensive ranking. Ranking factors considered when ranking the search results in the category of search results include at least one from the group consisting of an attribute of key information, a correlation between the search results and the search term, a content quality of the search results, and a click rate of the search results.

The process of filtering search results may be as follows: firstly, respective search results strongly related to the attribute of key information are selected from a category of search results. For example, when the key information is "XX game hero, assassin", respective search results involving the game video are selected; when the key information is "famous poet of the XX dynasty", respective search results involving encyclopedia information or famous poetry and prose of Li XX are selected; when the key information is "XXX's original song", respective search results involving the song audio are selected; when the key information is "spring/summer dress outfit", respective search results involving outfit suggestions or outfit guidelines are selected. Then, according to at least one from the group consisting of a correlation between the search results and the search term, a content quality of the search results, and a click rate of the search results, the above-described respective search results selected are ranked, and the top one or more search results are determined as final filtering results, so that information of highest-quality search results related to the search intention may be presented the in the target multimedia content, to further improve efficiency in consuming search results.

In the search result display method provided by the present disclosure, search results related to the respective search intentions corresponding to the search term may be displayed in regions on the search result page, and the search results related to the search intentions include key information representing the search intentions and the target multimedia content corresponding to the key information. In this way, the user may view search results of a plurality of search intentions simultaneously on the search result page, which improves efficiency of the user in filtering search results and enhances information content of the search result page. Moreover, respective search results of a same search intention are displayed in a same region on the search result page, so that the user may continuously consume search results corresponding to a certain search intention, which improves efficiency of the user in consuming the search results.

In an implementation provided by the present disclosure, the target search results related to the search intention are displayed in a card form. S120 includes: displaying a plurality of search result cards arranged in a preset direction on the search result page, wherein one search result card displays target search results related to one search intention.

For example, the preset direction is a preset display arrangement direction of the search result cards, which, for example, may be a horizontal direction or a vertical direction.

Specifically, the search result cards are utilized to display the target search results related to the search intention; and different search result cards correspond to different display regions on the search result page. In this case, a plurality of search result cards are arranged in the preset direction on the search result page. The user may switch between displaying different search result cards by sliding along the preset direction, so that the target search results related to the respective search intentions may be presented more flexibly.

Figure 3:
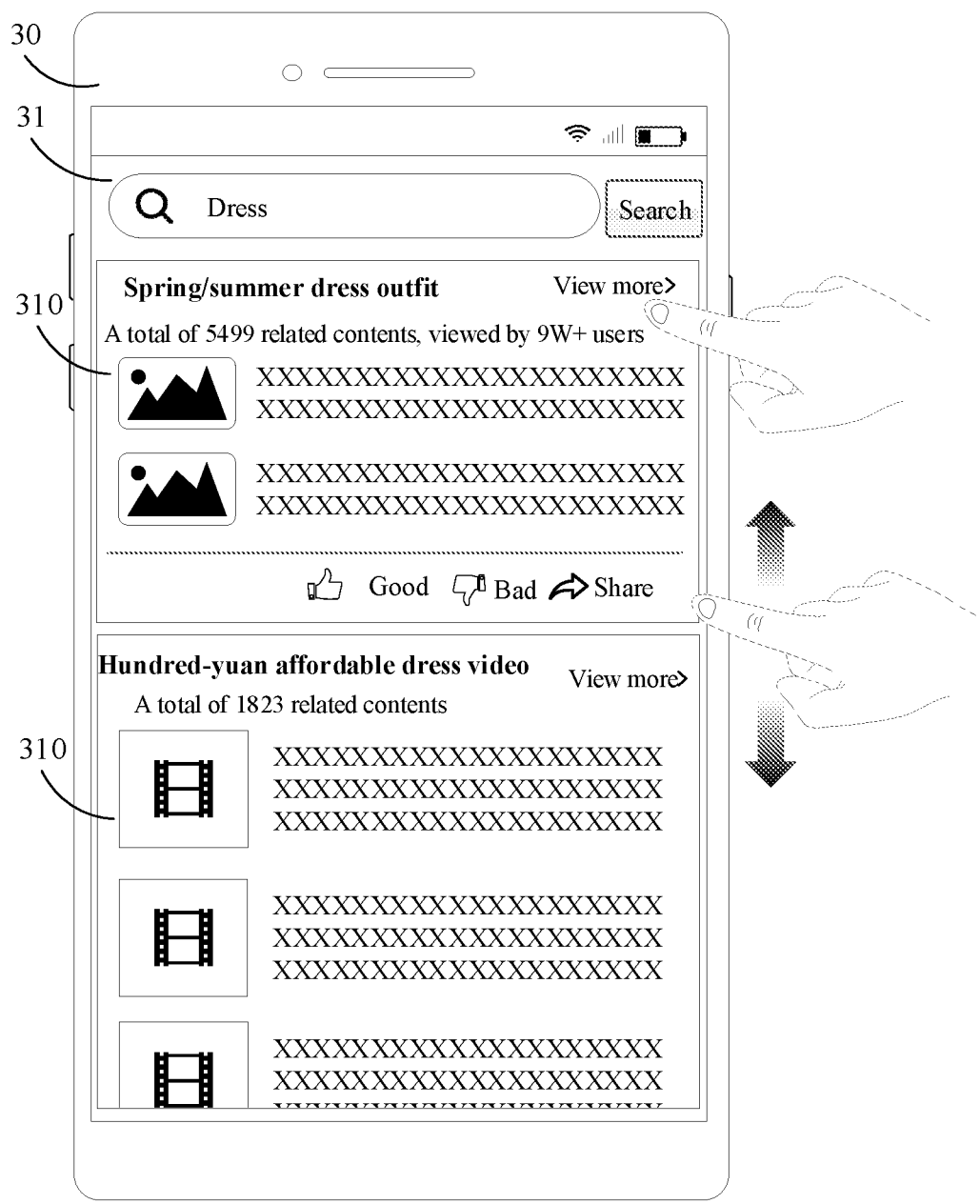
FIG. 3 is a schematic diagram of another search result page provided by an embodiment of the present disclosure.

In some embodiments, one or more columns of search result cards are vertically arranged on the search result page, to switch between displaying the respective search result cards by sliding along the vertical direction. As shown in FIG. 3, the electronic device 30 displays search result page 31, and vertically arranged column of search result cards 310 are displayed on search result page 31. Two search result cards 310 shown in FIG. 3 are respectively search result cards corresponding to the key information "spring/summer dress outfit" and key information "hundred-yuan affordable dress video" of the search term "dress". Since the display screen is limited, there are other search result cards that are not displayed. The user may slide vertically toward the top or the bottom on search result page 31 to switch between displaying different search result cards.

Figure 4:
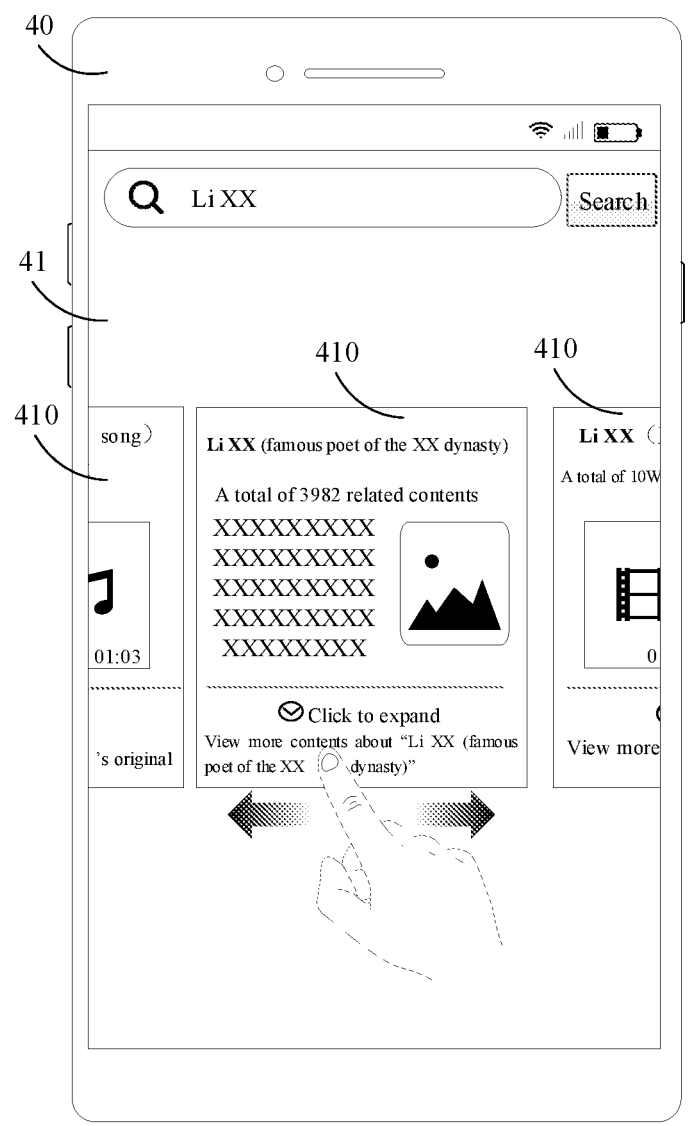
FIG. 4 is a schematic diagram of still another search result page provided by an embodiment of the present disclosure.

In some other embodiments, a row of search result cards are horizontally arranged on the search result page, to switch between displaying the respective search result cards by sliding along the horizontal direction. As shown in FIG. 4, the electronic device 40 displays search result page 41, and horizontally arranged row of search result cards 410 are displayed on search result page 41. Since the display screen is limited, there are other search result cards that are not displayed. The user may slide horizontally toward the left or the right on search result page 31 to switch between displaying different search result cards.

In another implementation provided by the present disclosure, the target search results related to the respective search intentions are displayed on the search result page in a ranked manner. S120 includes: displaying the target search results related to the respective search intentions in a first preset order in regions on the search result page.

For example, the first preset order is a predetermined ranking order. In the embodiment of the present disclosure, the first preset order is determined based on the user's degree of attention to the respective search intentions. The degree of attention here refers to a degree of interest of the user in a search intention; and the degree of attention to the respective search intentions may be determined according to historical behavior data of the user (e.g., historical search terms and historically consumed search results, etc.)

Specifically, the electronic device determines the first preset order of the respective target search results according to degrees of attention to the respective search intentions, then, ranks the respective target search results according to the first preset order, and finally, display the ranked respective target search results sequentially in regions on the search result page, so that the target search results the user may be most interested in are present firstly, which further improves filtering efficiency and consumption efficiency of search results.

In still another implementation provided by the present disclosure, the search result page further includes a plurality of search results corresponding to the search term.

In some embodiments, the target search results related to the respective search intentions and the respective search results corresponding to the search term are arranged on the search result page in a mixed manner. That is, S120 includes: displaying the target search results related to the respective search intentions and the plurality of search results corresponding to the search term in a second preset order in regions on the search result page.

For example, the second preset order is a predetermined ranking order. In the embodiment of the present disclosure, the second preset order is determined based on the user's degree of attention to the search intention and the first set indicator value of the search results; the first set indicator value includes at least one from the group consisting of a correlation between the search results and the search term, a content quality of the search results, and a click rate of the search results.

Specifically, when the respective target search results and the respective search results are arranged in a mixed manner, the electronic device may firstly determine a ranking value of a corresponding target search result according to the degree of attention to the search intention corresponding to the target search results, and the first set indicator value of at least some of the search results (e.g., the target multimedia content) in a category of search results corresponding to the target search results. Moreover, the electronic device may determine a ranking value of a corresponding search result, according to the user's degree of attention to the search result corresponding to the search term and the first set indicator value thereof. The user's degree of attention to the search result here are determined according to the user's degree of attention to the search intention corresponding to the search result. Then, the electronic device determines a second preset order between the respective target search results and the respective search results, according to the ranking values of the respective target search results and the ranking values of the respective search results. Thereafter, the respective target search results and the respective search results are arranged in a mixed manner according to the second preset order. Finally, the respective target search results and the respective search results arranged in a mixed manner are sequentially displayed in region on the search result page according to a rule of displaying one target search result or one search result in one specific region. In this way, the target search results the user may be most interested in are present firstly, which further improves filtering efficiency and consumption efficiency of search results.

Figure 5:
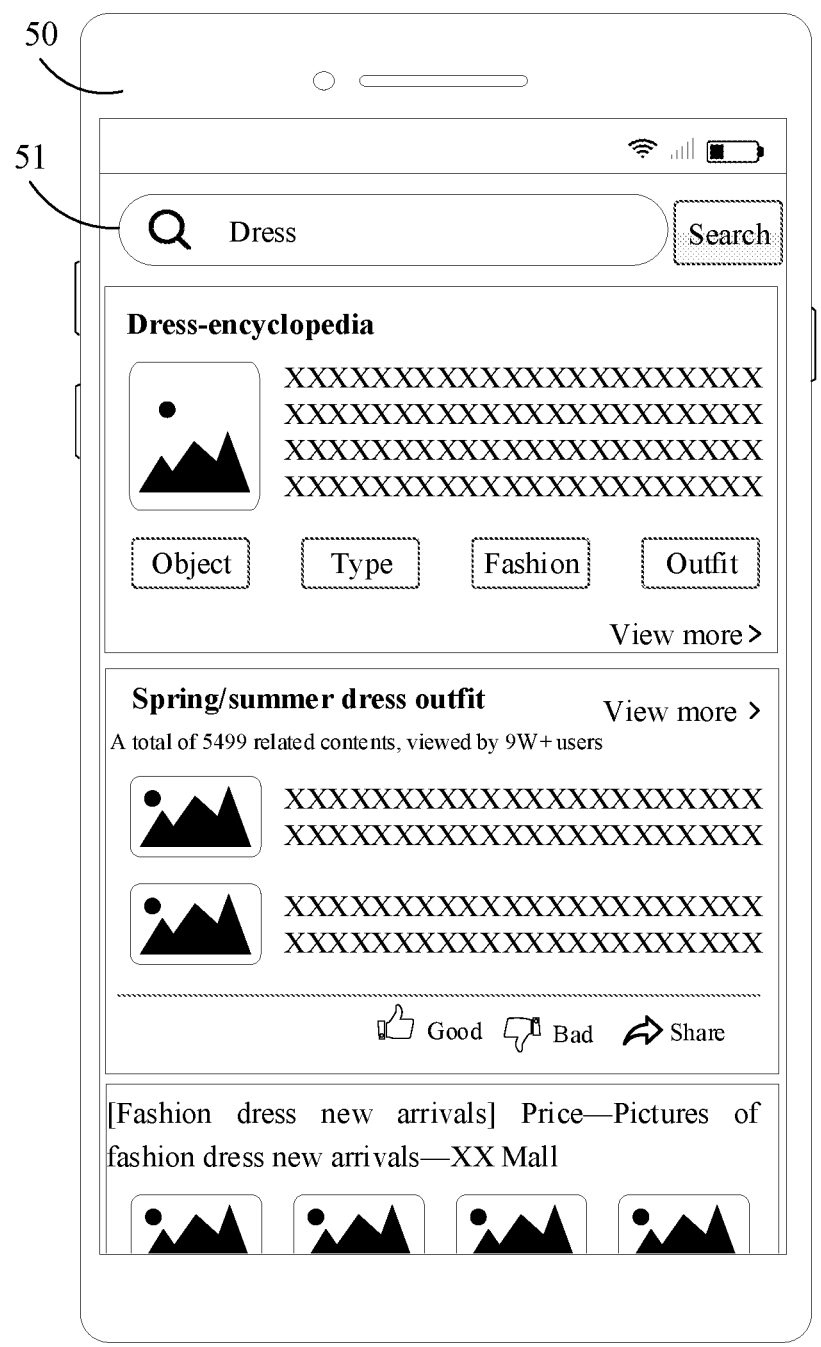
FIG. 5 is a schematic diagram of still another search result page provided by embodiment of the present disclosure.

As shown in FIG. 5, with respect to the search term "dress", there are three results displayed on search result page 51 of electronic device 50; a first result is an encyclopedia search result for the search term "dress", a second result is a target search result for the key information "spring/summer dress outfit" of the search intention, and a third result is a search result recommended by e-commerce for the search term "dress".

In some other embodiments, target search results related to the respective search intentions are displayed before the respective search results corresponding to the search term. S120 includes: displaying a plurality of search results corresponding to the search term in a target region of the search result page, wherein the target region is a display region after the regions where the target search results related to the respective search intentions are located.

Specifically, in order to improve information content on the search result page and continuity of search result consumption, in this embodiment, the target search results corresponding to the respective search intentions are displayed in regions on the search result page, and the respective search results corresponding to the search term are displayed in regions in the display region after the respective target search results.

Figure 6:
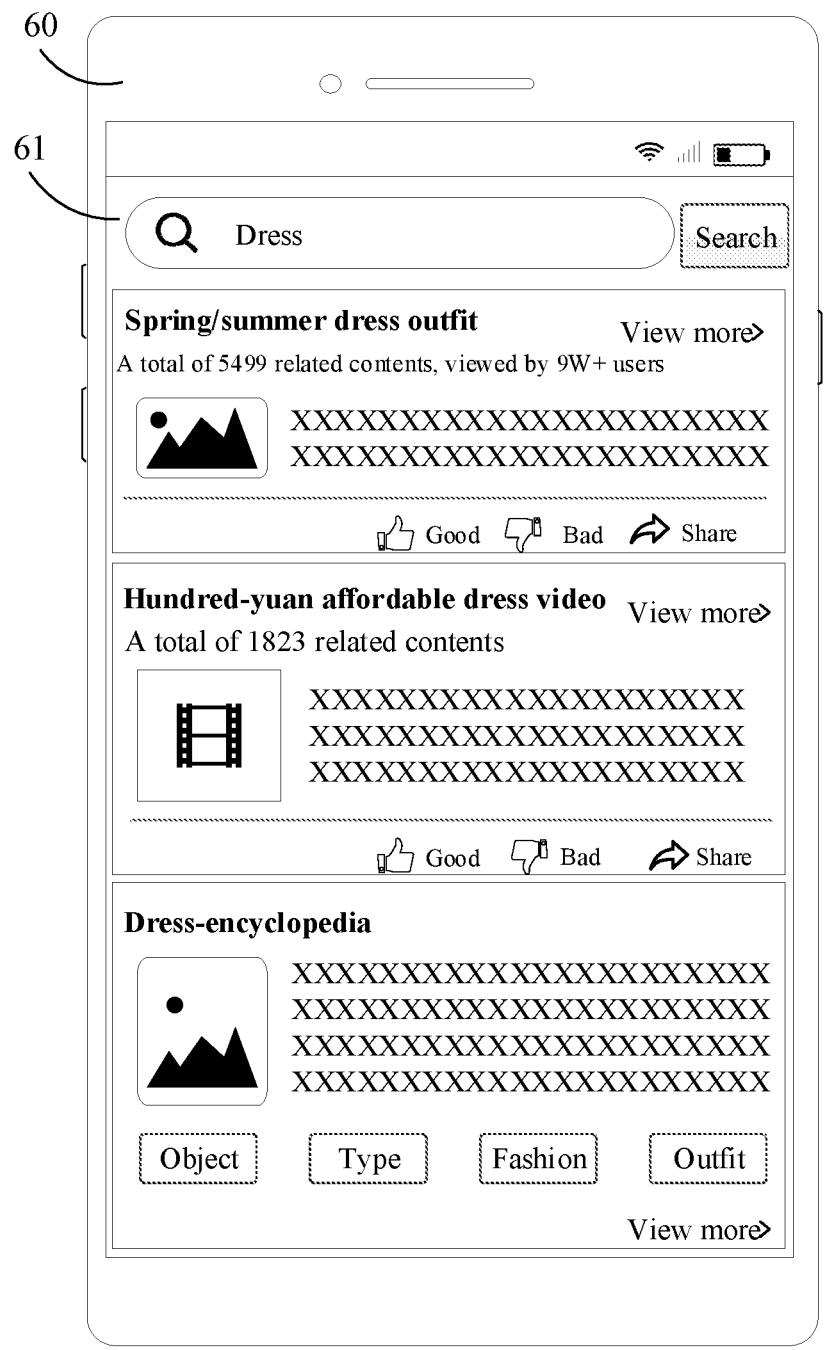
FIG. 6 is a schematic diagram of still another search result page provided by an embodiment of the present disclosure.

As shown in FIG. 6, with respect to the search term "dress", there are three results displayed on search result page 61 of electronic device 60; a first result is a target search result for the key information "spring/summer dress outfit" of the search intention, a second result is a target search result for the key information "hundred-yuan affordable dress video" of the search intention, and a third result is an encyclopedia search result for the search term "dress".

In addition, interactive operation controls such as "good", "bad" and "share", etc. in FIG. 6 may also be displayed in the target search results.

In another implementation provided by the present disclosure, the target search results related to the search intention further include a preset control; the preset control is used to trigger displaying the respective search results in a category of search results corresponding to the search intention. As shown in FIG. 2, a preset control "Click to expand and view more 'Li XX (* * *) content" is displayed below an display region of each target search result. As shown in FIG. 3, a preset control "View more" is displayed in an upper right corner of an display region of each target search result.

In some embodiments, more search results corresponding to the search intention are displayed on a new page. After S120, when a trigger operation on a preset control is detected, it jumps from the search result page to a special topic page, and displays a category of search results related to the search intentions corresponding to the preset control on the special topic page.

For example, the trigger operation may be a non-contact operation such as a click operation, a voice control, a gesture control, and an eye movement control, etc. A special topic page refers to a new page that displays a category of search results corresponding to an intention of a certain user.

Figure 7:
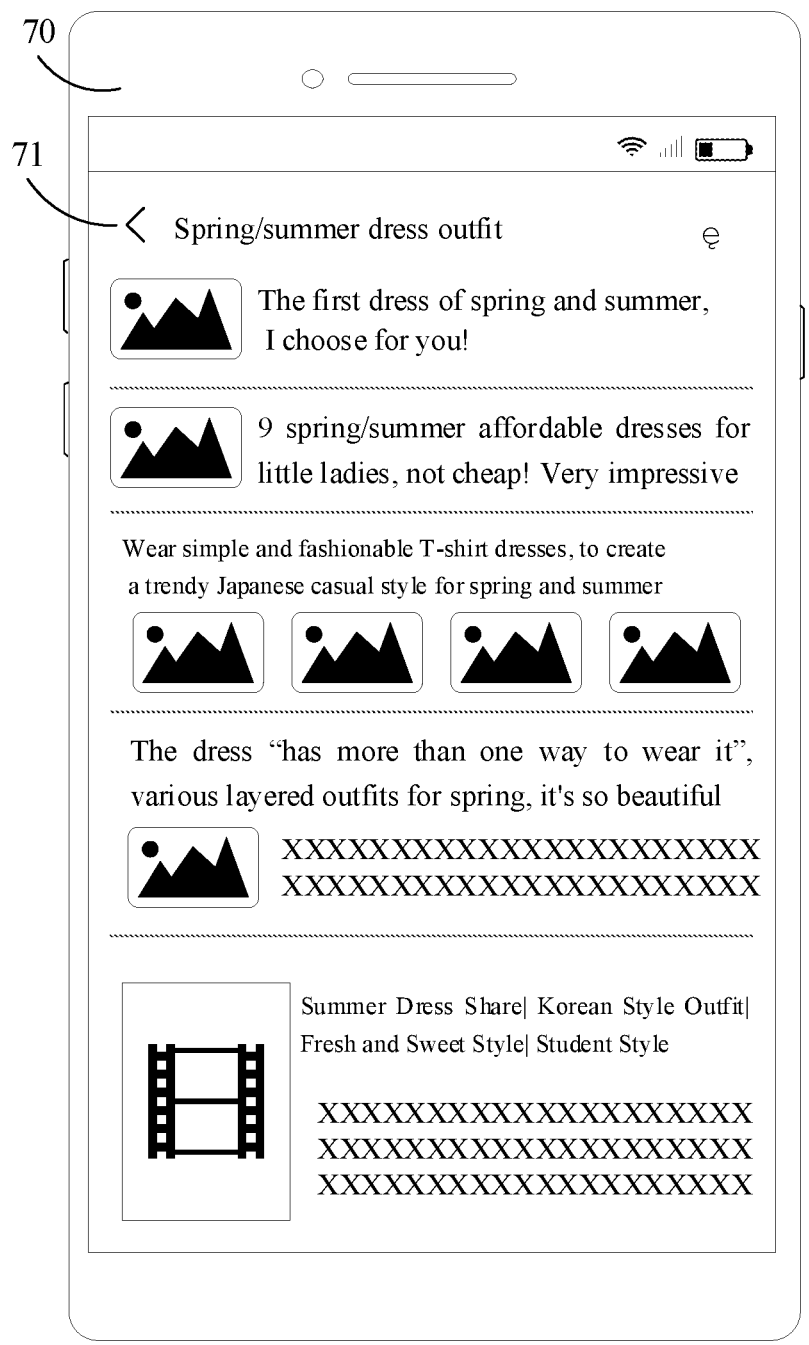
FIG. 7 is a schematic diagram of a special topic page provided by an embodiment of the present disclosure.

Specifically, as shown in FIG. 3, when electronic device 30 detects a trigger operation of a preset control in target search result 310 for the key information "spring/summer dress outfit" of the search intention of the user on search result page 31, it jumps from search result page 31 to the special topic page for display, and a display effect is as shown in FIG. 7. In FIG. 7, electronic device 70 displays special topic page 71; and special topic page 71 displays a plurality of search results in a category of search results corresponding to the key information "spring/summer dress outfit" of the search intention.

In some other embodiments, more search results corresponding to the search intention are displayed on a floating layer page (a page in a floating window). That is, after S120, when a trigger operation on a preset control is detected, a floating layer page is created on the search result page, and a category of search results related to the search intentions corresponding to the preset control are displayed on the floating layer page.

Figure 8:
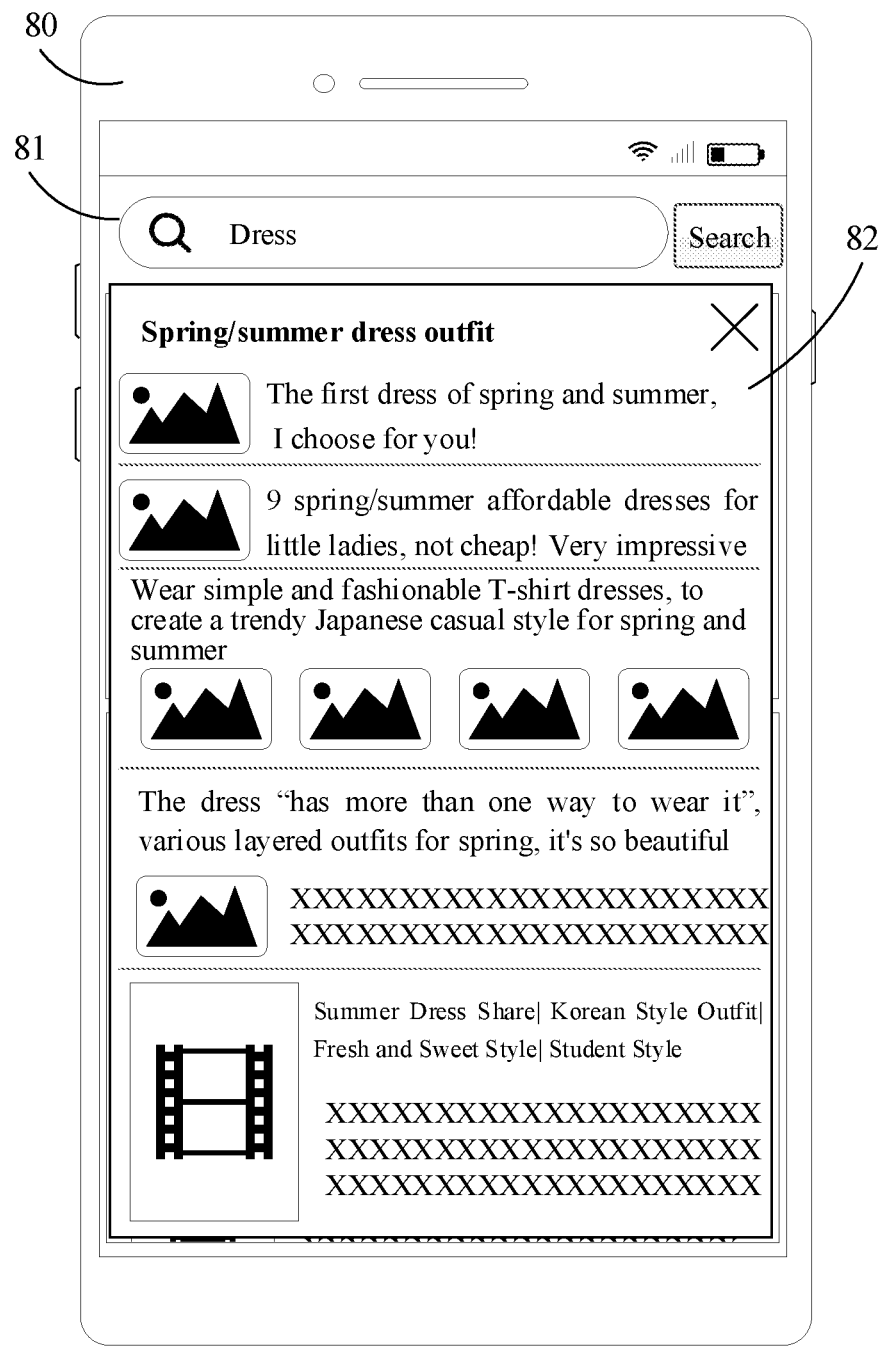
FIG. 8 is a schematic diagram of a floating layer page provided by an embodiment of the present disclosure.

Specifically, as shown in FIG. 3, when electronic device 30 detects the trigger operation of the preset control in target search result 310 for the key information "spring/summer dress outfit" of the search intention of the user on search result page 31, a floating layer page is created on search result page 31 for display, and a display effect is as shown in FIG. 8. In FIG. 8, search result page 81 is displayed in electronic device 80, floating layer page 82 is displayed on search result page 81, and floating layer page 82 displays a plurality of search results in a category of search results corresponding to the key information "spring/summer dress outfit" of the search intention. If the user needs to return to search result page 81, he/she only needs to close floating layer page 81, which further improves to some extent efficiency of the user consuming search results.

In still other embodiments, more search results corresponding to the search intention are displayed in an expanded manner on the search result page. That is, after S120, when a trigger operation on a preset control is detected, a region corresponding to the preset control is expanded on the search result page; a category of search results related to the search intentions corresponding to the preset control are displayed in the expanded region; and the target search results related to the respective search intention that are located after the region corresponding to the preset control in an expansion direction are moved along an expansion direction.

Figure 9:
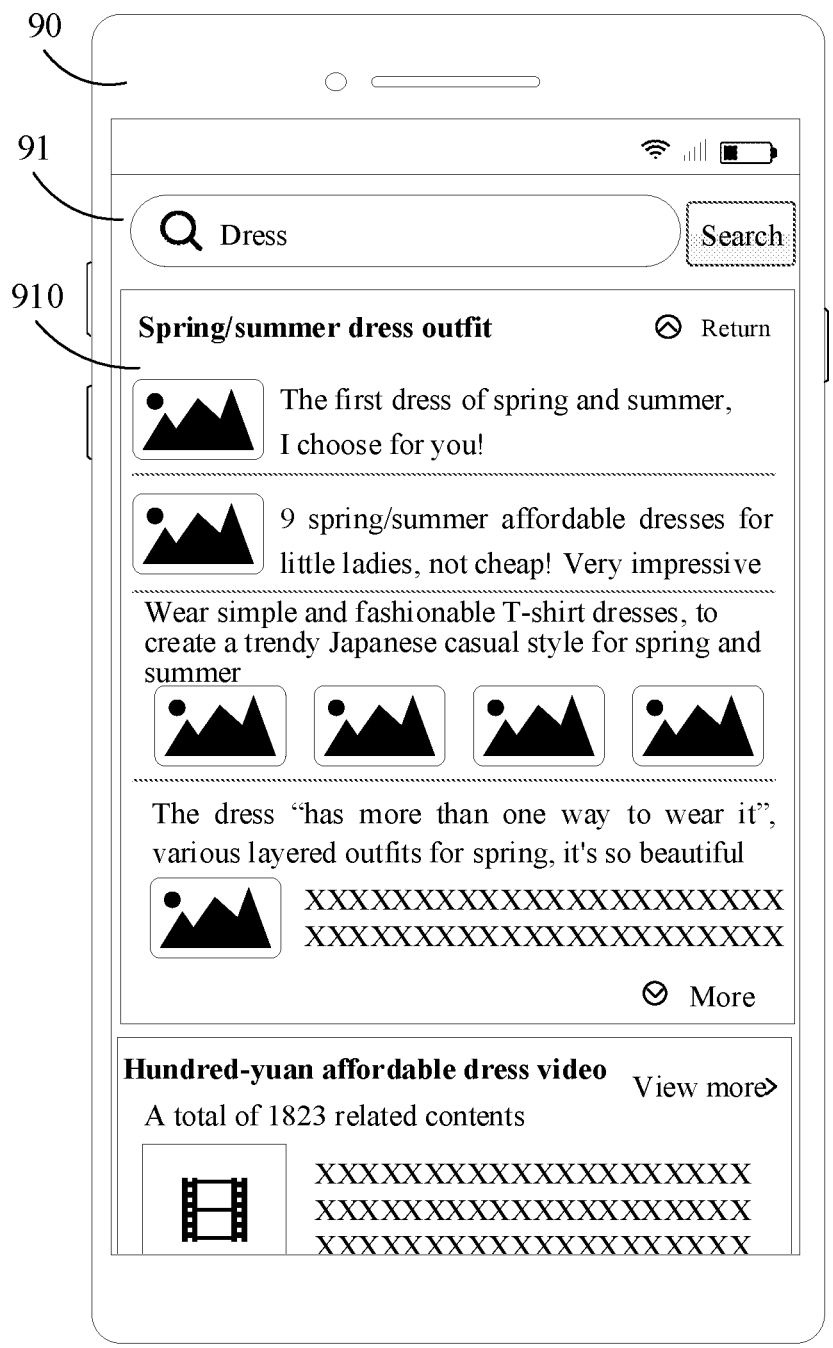
FIG. 9 is a schematic diagram of still another search result page provided by an embodiment of the present disclosure.

Specifically, as shown in FIG. 3, when electronic device 30 detects a trigger operation of a preset control in target search result 310 of the key information "spring/summer dress outfit" of the search intention of the user on search result page 31, a region where target search result 310 is located is expanded downward to display a plurality of search results in a category of search results corresponding to the key information "spring/summer dress outfit" of the search intention, and a display effect is as shown in FIG. 9. In FIG. 9, search result page 91 is displayed in electronic device 90. A display region where target search result 910 corresponding to the key information "spring/summer dress outfit" of the search intention is located on search result page 91 is expanded downward to a certain scope, and a plurality of search results in a category of search results corresponding to the key information "spring/summer dress outfit" of the search intention are displayed in the expanded display region. After the target search results corresponding to the key information "spring/summer dress outfit", the display region where the respective target search results are located will be moved downward in succession. For example, the target search results for the key information "hundred-yuan affordable dress video" in FIG. 3 are displayed in a central portion of search result page 31, while the target search results for the key information "hundred-yuan affordable dress video" in FIG. 9 are moved downward and displayed at an end portion of search result page 91. In addition, the expanded display region may display controls such as "More" that trigger displaying more search results, or may also display controls such as "Return" that trigger displaying respective search results that slide out of the display region, and controls that return the original target search results. In this way, display flexibility of more search results corresponding to the search intention may be improved to some extent.

An embodiment of the present disclosure further provides a search result display apparatus, which will be illustrated in conjunction with FIG. 10 below.

In the embodiment of the present disclosure, the search result display apparatus may be an electronic device. For example, the electronic device may include but not limited to a mobile terminal such as a mobile phone, a laptop, a digital broadcast receiver, a PDA, a PAD, a PMP, a vehicle-mounted terminal (e.g., a vehicle-mounted navigation terminal), a wearable device, etc., and a stationary terminal such as a digital TV, a desktop computer, a smart home appliance, etc.

Figure 10:
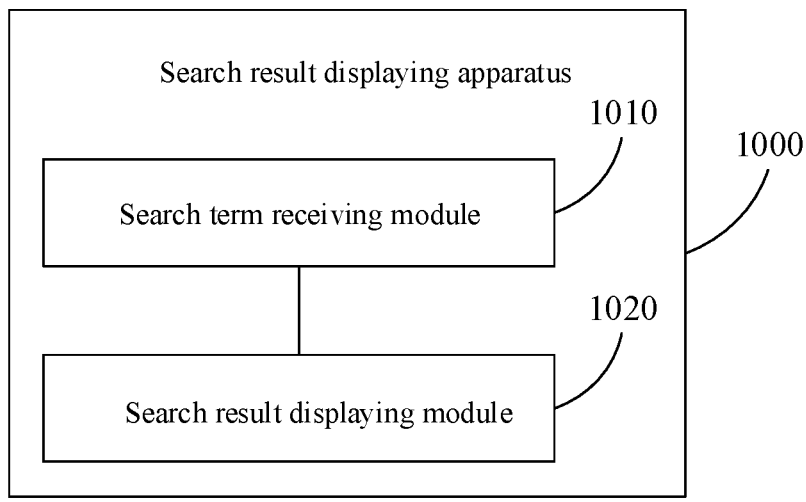
FIG. 10 is a structural schematic diagram of a search result display apparatus provided by an embodiment of the present disclosure.

FIG. 10 shows a structural schematic diagram of a search result display apparatus provided by an embodiment of the present disclosure.

As shown in FIG. 10, the search result display apparatus 1000 may include a search term receiving module 1010 and a search result displaying module 1020.

The search term receiving module 1010 is configured to receive a search term, the search term corresponding to a plurality of search intentions;

The search result displaying module 1020 is configured to display target search results related to the respective search intentions in regions on the search result page, wherein the target search results include key information representing the search intention, and a target multimedia content corresponding to the key information.

The above-described search result display apparatus may display search results related to the respective search intentions corresponding to the search term in regions on the search result page, and the search results related to the search intention include key information representing the search intention and the target multimedia content corresponding to the key information. In this way, the user may view search results of a plurality of search intentions simultaneously on the search result page, which improves efficiency of the user in filtering search results and enhances information content of the search result page. Moreover, respective search results of a same search intention are displayed in a same region on the search result page, so that the user may continuously consume search results corresponding to a certain search intention, which improves efficiency of the user in consuming the search results.

In some embodiments, the search result displaying module 1020 is specifically configured to:

Display a plurality of search result cards arranged in a preset direction on the search result page, wherein different search result cards display target search results related to different search intentions.

In some embodiments, the target multimedia contents include multimedia content preview information; and the multimedia content preview information is used for displaying core information of the target multimedia content.

In some embodiments, the search result displaying module 1020 is specifically configured to:

Displaying the target search results related to the respective search intentions in a first preset order in regions on the search result page, wherein the first preset order is determined based on the user's degree of attention to the respective search intentions.

In some embodiments, the search result displaying module 1020 is further specifically configured to:

Display the target search results related to the respective search intentions and the plurality of search results corresponding to the search term in a second preset order in regions on the search result page, wherein different regions display target search results related to different search intentions or search results corresponding to the search term; the second preset order is determined based on the user's degree of attention to the search intention and the first set indicator value of the search results; and the first set indicator value includes at least one from the group consisting of a correlation between the search results and the search term, a content quality of the search results, and a click rate of the search results;

Or, display a plurality of search results corresponding to the search terms in a target region on the search result page, wherein the target region is a display region after the regions where the target search results related to the respective search intentions are located.

In some embodiments, the search result displaying module 1020 is further specifically configured to:

Filter and determine the target multimedia content from a category of search results related to the search intentions based on a second set indicator value, wherein the category of search results related to the search intentions are the respective search results related to the search intention among the respective search results corresponding to the search term;

Wherein the second set indicator value includes at least one from the group consisting of an attribute of key information, a correlation between the search results and the search term, a content quality of the search results, and a click rate of the search results.

In some embodiments, the target search results related to the search intention further include a preset control;

Accordingly, the search result display apparatus 1000 further includes a category search result displaying module, configured to:

Jump from the search result page to a special topic page, after displaying the target search results related to the respective search intentions in regions on the search result page, and in a case where a trigger operation on the preset control is detected, and display a category of search results related to the search intentions corresponding to the preset control on the special topic page;

Or, create a floating layer page on the search result page, after displaying the target search results related to the respective search intentions in regions on the search result page, and in a case where a trigger operation on the preset control is detected, and display a category of search results related to the search intentions corresponding to the preset control on the floating layer page;

Or, expand a region corresponding to the preset control on the search result page, after displaying the target search results related to the respective search intentions in regions on the search result page, and in a case where a trigger operation on a preset control is detected, and display a category of search results related to the search intentions corresponding to the preset control in the expanded region, and move the target search results related to the respective search intentions located after the region corresponding to the preset control in an expansion direction along the expansion direction.

In some embodiments, the target search results related to the search intentions further include the number of a category of search results related to the corresponding search intentions.

In some embodiments, the search intention is either a polysemy search intention or a multi-topic search intention.

It should be noted that the search result display apparatus 1000 shown in FIG. 10 may execute the respective steps according to the method embodiments shown in FIG. 1 to FIG. 9, and implement the respective processes and effects according to the method embodiments shown in FIG. 1 to FIG. 9, and no details will be repeated here.

An embodiment of the present disclosure further provides a search result display device; the search result display device may include a processor and a memory; and the memory may be configured to store executable instructions. For example, the processor may be configured to read the executable instructions from the memory and execute the executable instructions to implement the search result display method according to the above-described embodiment.

Figure 11:
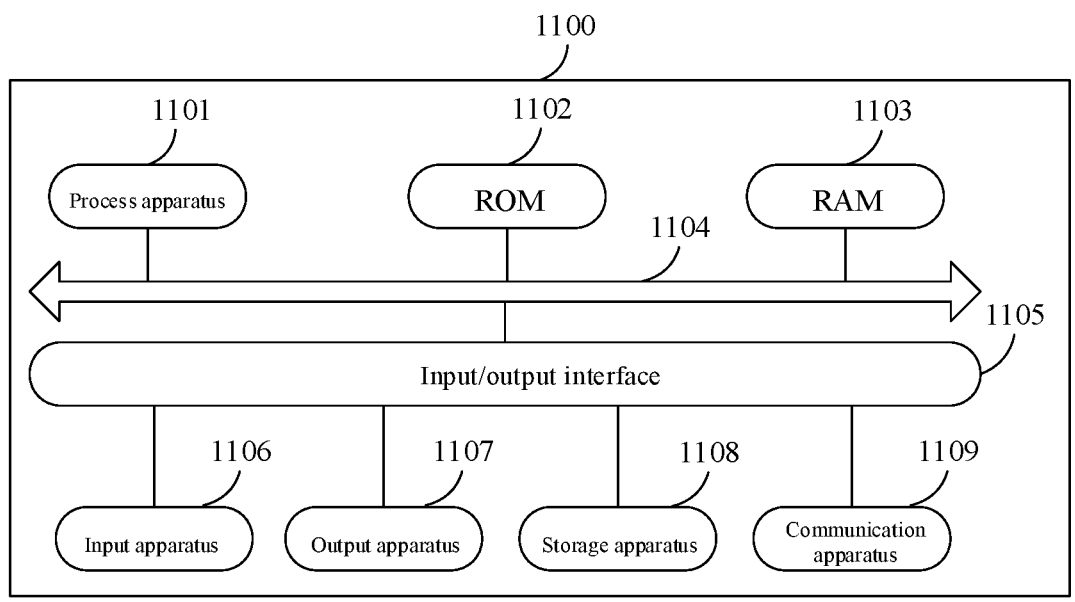
FIG. 11 is a structural schematic diagram of a search result display device provided by an embodiment of the present disclosure.

FIG. 11 shows a structural schematic diagram of a search result display device provided by an embodiment of the present disclosure. Hereinafter, specifically referring to FIG. 11, it shows a structural schematic diagram of a search result display device 1100 suitable for implementing the embodiment of the present disclosure.

The search result display device 1100 according to the embodiment of the present disclosure may be an electronic device. For example, the electronic device may include but not limited to a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), a wearable device, etc., and a stationary terminal such as a digital TV, a desktop computer, a smart home appliance, etc.

It should be noted that the search result display device 1100 shown in FIG. 11 is only an example and should not impose any limitation on functionality and scope of use of the embodiment of the present disclosure.

As shown in FIG. 11, the search result display device 1100 may include a process apparatus (e.g., a central processing unit, a graphics processing unit, etc.) 1101, which may executes various appropriate actions and processing according to a program stored in a Read-Only Memory (ROM) 1102 or a program loaded from a storage apparatus 1108 into a Random Access Memory (RAM) 1103. The RAM 1103 further stores various programs and data required for operation of the information processing device 1100. The process apparatus 1101, the ROM 1102, and the RAM 1103 are connected with each other through a bus 1104. An input/output (I/O) interface 1105 is also coupled to the bus 1104.

Usually, apparatuses below may be coupled to the I/O interface 1105: input apparatuses 1106 including, for example, a touch screen, a touch pad, a keyboard, a mouse, a camera, a microphone, an accelerometer, a gyroscope, etc.; output apparatuses 1107 including, for example, a Liquid Crystal Display (LCD), a speaker, a vibrator, etc.; storage apparatuses 1108 including, for example, a magnetic tape, a hard disk, etc.; and a communication apparatus 1109. The communication apparatus 1109 may allow the search result display device 1100 to perform wireless or wired communication with other device so as to exchange data. Although FIG. 11 shows the search result display device 1100 including various apparatuses, it should be understood that, it is not required to implement or have all the apparatuses shown, and the search result display device 1100 may optionally implement or have more or fewer apparatuses.

An embodiment of the present disclosure further provides a computer readable storage medium, on which a computer program is stored, wherein the computer programs, when executed by a processor, causes the processer to implement the search result display method according to the above-described embodiment.

Specifically, according to the embodiments of the present disclosure, the process described above with reference to a flow chart may be implemented as computer software programs. For example, the embodiments of the present disclosure include a computer program product, including a computer program carried on a non-temporary computer readable medium, the computer program containing program codes for executing the method shown in the flow chart. In such embodiments, the computer program may be downloaded and installed from the network via the communication apparatus 1109, or installed from the storage apparatus 1108, or installed from the ROM 1102. When executed by the process apparatus 1101, the computer program may execute the above-described functions defined in the information display method according to the embodiment of the present disclosure.

It should be noted that, the above-described computer readable medium according to the present disclosure may be a computer readable signal medium or a computer readable storage medium or any combination of the above two. The computer readable storage medium may be, for example, but not limited to, an electronic, magnetic, optical, electromagnetic, infrared, or semiconductor system, apparatus, or device, or any suitable combination of the above. More specific examples of the computer readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or flash memory); an optical fiber, a portable Compact Disc Read-Only Memory (CD-ROM); an optical storage device; a magnetic storage device; or any suitable combination of the above. In the present disclosure, a computer readable storage medium may be any tangible medium that contains or stores a program that may be used by or in conjunction with an instruction executing system, an apparatus, or a device. Rather, in the present disclosure, the computer readable signal medium may include a data signal propagated in baseband or as a portion of a carrier wave, which carries a computer readable program code therein. Such propagated data signals may take a variety of forms, including but not limited to, electromagnetic signals, optical signals, or any suitable combination of the above. The computer readable signal medium may also be any computer readable medium other than a computer readable storage medium; and the computer readable signal medium may transmit, propagate, or transport programs for use by or in combination with the instruction executing system, the apparatus, or the device. The program code embodied on the computer readable medium may be transmitted by using any suitable medium, including, but not limited to, an electrical wire, an optical cable, a Radio Frequency (RF), etc., or any suitable combination of the above.

In some implementations, the client and the server may communicate with any network protocol currently known or to be researched and developed in the future such as HTTP, and may communicate (e.g., via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer readable medium may be included in the above-described search result display device; or may also exist alone without being assembled into the search result display device.

The above-described computer readable medium carries one or more programs; and when executed by the search result display device, the above-described one or more programs cause the search result display device to execute the steps of the search result display method illustrated in the above-described respective embodiments.

In the embodiments of the present disclosure, the computer program codes for executing the operations according to the present disclosure may be written in one or more programming languages or a combination thereof; the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (e.g., through the Internet using an Internet Service Provider).

The flow chart and block diagrams in the accompanying drawings illustrate the architecture, functionality, and operation of possible implementations of devices, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by software or hardware. For example, a name of the unit does not constitute limitation of the unit per se in some cases.

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

In the context of the present disclosure, a machine-readable medium may be a tangible medium, which may contain or store programs for use by or in combination with an instruction executing system, an apparatus or a device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the above contents. A more specific example of the machine-readable storage medium would include an electrical connection based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disk Read-Only Memory (CD-ROM), an optical storage device, a magnetic storage device, or any suitable combination of the above contents.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced with each other to form a technical solution.

Furthermore, although the respective operations are described in a particular order, this should not be understood as requiring the operations to be executed in the particular order shown or in a sequential order. Under certain circumstances, multitasking and parallel processing may be favorable. Similarly, although the above discussion contains a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

The invention claimed is:

1. A search result display method, applied to a search engine, the method comprising:
 receiving a search term, based on which the search engine is required to perform a search operation and feed results back, wherein the search term corresponds to a plurality of search intentions, the search term comprises a keyword, and the keyword is extracted by a machine learning model; and
 displaying target search results related to respective search intentions in regions on a search result page, wherein the target search results comprise key information representing the search intentions and target multimedia contents corresponding to the key information, wherein the search result page is a page used to display search feedback information, the search feedback information is respective search results corresponding to the search term, and the target multimedia contents comprise at least one from a group consisting of a text, an image, an audio, and a video;
 wherein the target multimedia content is filtered and determined from a category of search results related to the search intentions based on a second set indicator value,
 wherein the second set indicator value comprises at least one from a group consisting of a content quality of the search result and a click rate of the search result;
 wherein the target search result related to the search intention further comprise a preset control;
 after displaying the target search results related to the respective search intentions in the regions on the search result page, the method further comprises:
 expanding a region corresponding to the preset control on the search result page, in a case where a trigger operation on the preset control is detected, displaying a category of search results related to the search intentions corresponding to the preset control in the expanded region, and moving the target search results related to the respective search intentions located after the region corresponding to the preset control in an expansion direction along the expansion direction.

2. The method according to claim 1, wherein the displaying target search results related to respective search intentions in regions on the search result page, comprises:
 displaying a plurality of search result cards arranged in a preset direction on the search result page, wherein different search result cards display target search results related to different search intentions.

3. The method according to claim 1, wherein the target multimedia contents comprise multimedia content preview information, and the multimedia content preview information is configured to display core information of the target multimedia contents.

4. The method according to claim 1, wherein the displaying target search results related to respective search intentions in regions on the search result page, comprises:
 displaying the target search results related to the respective search intentions in a first preset order in the regions on the search result page, wherein the first preset order is determined based on a user's degree of attention to the respective search intentions.

5. The method according to claim 1, wherein the displaying target search results related to respective search intentions in regions on the search result page, comprises:
 displaying the target search results related to the respective search intentions and a plurality of search results corresponding to the search term in a second preset order in the regions on the search result page, wherein different regions display the target search results related to different search intentions or search results corresponding to the search term, the second preset order is determined based on a user's degree of attention to the search intention and a first set indicator value of the search results, and the first set indicator value comprises at least one from a group consisting of a correlation between the search results and the search term, the content quality of the search results, and the click rate of the search results.

6. The method according to claim 1, wherein the method further comprises:
 displaying a plurality of search results corresponding to the search term in a target region on the search result page, wherein the target region is a display region after the regions where the target search results related to the respective search intentions are located.

7. The method according to claim 1, wherein the target search results related to the search intentions further comprise a number of a category of search results related to the search intentions.

8. The method according to claim 1, wherein the search intentions comprise a polysemy search intention or a multi-topic search intention.

9. A search result display apparatus, applied to a search engine, the apparatus comprising:
 a search term receiving module, configured to receive a search term, based on which the search engine is required to perform a search operation and feed results back, wherein the search term corresponds to a plurality of search intentions, the search term comprises a keyword, and the keyword is extracted by a machine learning model;
 a search result displaying module, configured to display target search results related to respective search intentions in regions on a search result page, wherein the target search results comprise key information representing the search intentions, and a target multimedia contents corresponding to the key information, wherein the search result page is a page used to display search feedback information, the search feedback information is respective search results corresponding to the search term, and the target multimedia contents comprise at least one from a group consisting of a text, an image, an audio, and a video;

wherein the target multimedia content is filtered and determined from a category of search results related to the search intentions based on a second set indicator value, wherein the second set indicator value comprises at least one from a group consisting of a content quality of the search result and a click rate of the search result;

wherein the target search result related to the search intention further comprise a preset control;

after displaying the target search results related to the respective search intentions in the regions on the search result page, the search result displaying module is further configured to:

expand a region corresponding to the preset control on the search result page, in a case where a trigger operation on the preset control is detected, display a category of search results related to the search intentions corresponding to the preset control in the expanded region, and move the target search results related to the respective search intentions located after the region corresponding to the preset control in an expansion direction along the expansion direction.

10. The search result display apparatus according to claim 9, wherein the display target search results related to respective search intentions in regions on the search result page, comprises:

displaying a plurality of search result cards arranged in a preset direction on the search result page, wherein different search result cards display target search results related to different search intentions.

11. The search result display apparatus according to claim 9, wherein the target multimedia contents comprise multimedia content preview information, and the multimedia content preview information is configured to display core information of the target multimedia content.

12. The search result display apparatus according to claim 9, wherein the display target search results related to respective search intentions in regions on the search result page, comprises:

displaying the target search results related to the respective search intentions in a first preset order in the regions on the search result page wherein the first preset order is determined based on a user's degree of attention to the respective search intentions.

13. The search result display apparatus according to claim 9, wherein the display target search results related to respective search intentions in regions on the search result page, comprises:

displaying the target search results related to the respective search intentions and a plurality of search results corresponding to the search term in a second preset order in the regions on the search result page, wherein different regions display the target search results related to different search intentions or search results corresponding to the search term, the second preset order is determined based on a user's degree of attention to the search intention and a first set indicator value of the search results, and the first set indicator value comprises at least one from a group consisting of a correlation between the search results and the search term, the content quality of the search results, and the click rate of the search results.

14. The search result display apparatus according to claim 9, wherein the search result displaying module is further configured to:

display a plurality of search results corresponding to the search term in a target region on the search result page, wherein the target region is a display region after the regions where the target search results related to the respective search intentions are located.

15. A search result display device, applied to a search engine, the device comprising:

a processor;

a memory, configured to store executable instructions;

wherein the processor is configured to read the executable instructions from the memory and execute the executable instructions to:

receive a search term, based on which the search engine is required to perform a search operation and feed results back, wherein the search term corresponds to a plurality of search intentions, the search term comprises a keyword, and the keyword is extracted by a machine learning model; and display target search results related to respective search intentions in regions on a search result page, wherein the target search results comprise key information representing the search intentions and target multimedia contents corresponding to the key information, wherein the search result page is a page used to display search feedback information, the search feedback information is respective search results corresponding to the search term, and the target multimedia contents comprise at least one from a group consisting of a text, an image, an audio, and a video;

wherein the target multimedia content is filtered and determined from a category of search results related to the search intentions based on a second set indicator value, wherein the second set indicator value comprises at least one from a group consisting of a content quality of the search result and a click rate of the search result;

wherein the target search result related to the search intention further comprise a preset control;

after displaying the target search results related to the respective search intentions in the regions on the search result page, the processor is further configured to:

expand a region corresponding to the preset control on the search result page, in a case where a trigger operation on the preset control is detected, display a category of search results related to the search intentions corresponding to the preset control in the expanded region, and move the target search results related to the respective search intentions located after the region corresponding to the preset control in an expansion direction along the expansion direction.

16. A computer readable non-transitory storage medium, on which a computer program is stored, wherein the computer program is applied to a search engine, wherein the computer program, when executed by a processor, causes the processer to:

receive a search term, based on which the search engine is required to perform a search operation and feed results back, wherein the search term corresponds to a plurality of search intentions, the search term comprises a keyword, and the keyword is extracted by a machine learning model; and display target search results related to respective search intentions in regions on a search result page, wherein the target search results comprise key information representing the search intentions and target multimedia contents corresponding to the key information, wherein the search result page is a page used to display search feedback information, the search feedback information is respective search results corresponding to the search term, and the target multimedia contents comprise at least one from a group consisting of a text, an image, an audio, and a video;

wherein the target multimedia content is filtered and determined from a category of search results related to the search intentions based on a second set indicator value, wherein the second set indicator value comprises at least one from a group consisting of a content quality of the search result and a click rate of the search result;

wherein the target search result related to the search intention further comprise a preset control;

after displaying the target search results related to the respective search intentions in the regions on the search result page, the processor is further caused to:

expand a region corresponding to the preset control on the search result page, in a case where a trigger operation on the preset control is detected, display a category of search results related to the search intentions corresponding to the preset control in the expanded region, and move the target search results related to the respective search intentions located after the region corresponding to the preset control in an expansion direction along the expansion direction.

* * * * *